United States Patent [19]

Nakajima et al.

[11] Patent Number: 5,280,519
[45] Date of Patent: Jan. 18, 1994

[54] COMMUNICATION APPARATUS CAPABLE OF DATA COMMUNICATION AND SPEECH COMMUNICATION

[75] Inventors: Masato Nakajima, Yokohama; Osamu Suzuki, Atsugi, both of Japan

[73] Assignee: Ricoh Company, Ltd., Tokyo, Japan

[21] Appl. No.: 821,195

[22] Filed: Jan. 16, 1992

[30] Foreign Application Priority Data

Jan. 16, 1991 [JP] Japan ................................. 3-015006
May 1, 1991 [JP] Japan ................................. 3-126534
Dec. 13, 1991 [JP] Japan ................................. 3-351259

[51] Int. Cl.$^5$ ......................................... H04M 11/00
[52] U.S. Cl. ..................... 379/100; 379/94; 358/442; 358/468
[58] Field of Search ................. 379/93, 94, 96, 97, 379/98, 100; 358/434, 435, 436, 438, 442, 468

[56] References Cited

U.S. PATENT DOCUMENTS

| 4,800,439 | 1/1989 | Yoshino | 379/100 |
| 4,811,385 | 3/1989 | Watanabe | 379/100 |
| 4,868,865 | 9/1989 | Ogawa et al. | 379/100 |
| 4,916,607 | 4/1990 | Teraichi et al. | 379/100 |

Primary Examiner—Jin F. Ng
Assistant Examiner—Jason Chan
Attorney, Agent, or Firm—Oblon, Spivak, McClelland, Maier & Neustadt

[57] ABSTRACT

A communication apparatus which can carry out a facsimile communication with a calling station and a speech communication with the calling station. The communication apparatus includes, a monitoring block for monitoring received signals, a first determining block for determining, based on a result obtained by the monitoring block, whether or not a first signal transmitted from the calling station is received, a transmission block for transmitting a second signal to the calling station, a first control block for activating the transmission block in a case where the first determining block determines that the first signal is not received within a first time after the communication apparatus becomes capable of communicating to the calling station, a ringing unit for outputting a ringing tone, a second control block for activating the ringing unit when a second time elapses from a time at which the transmission block starts to transmit the second signal, and a third control block for performing the facsimile communication when the first determining block determines that the first signal is received.

12 Claims, 16 Drawing Sheets

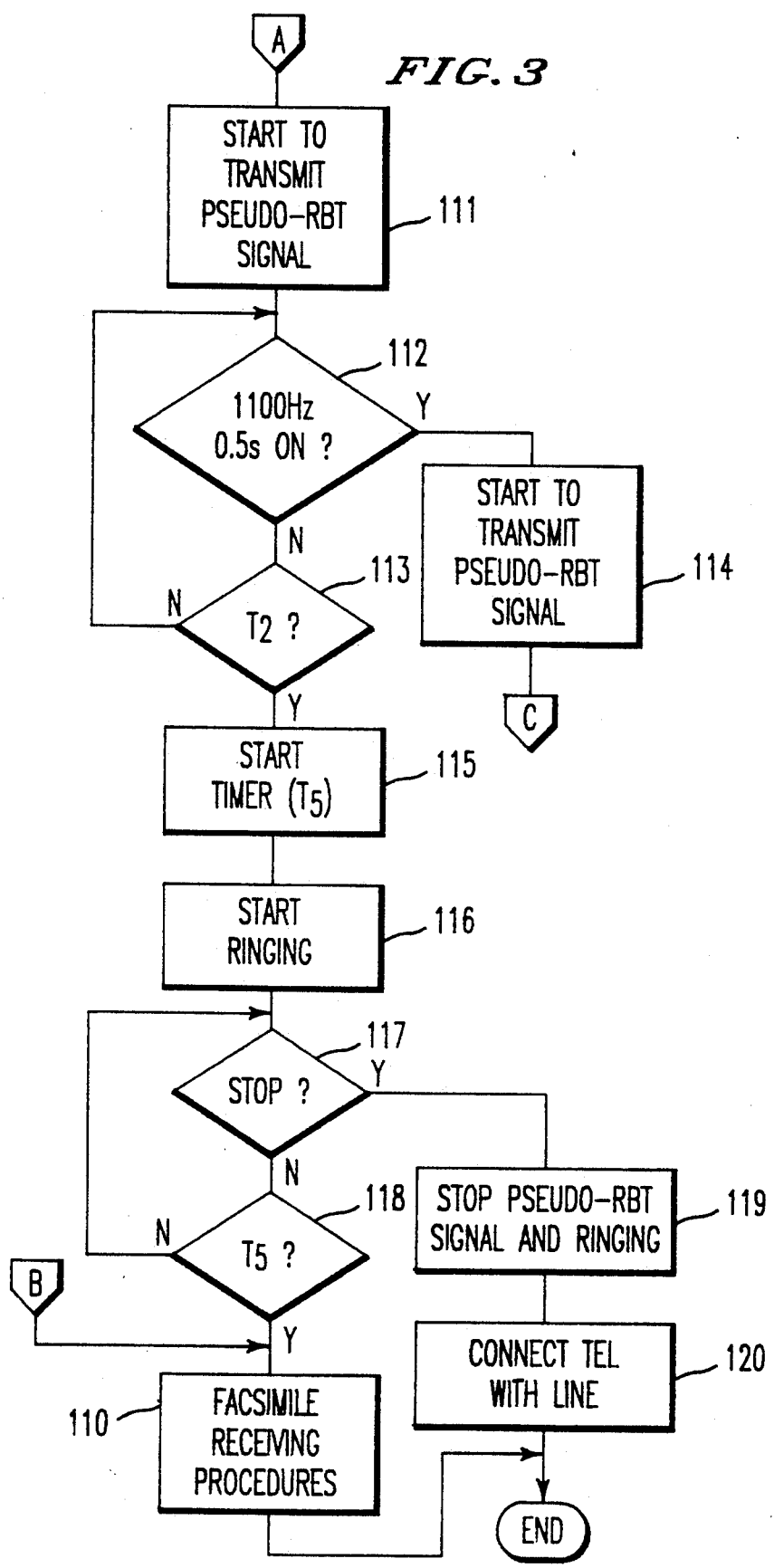

COMMUNICATION APPARATUS CAPABLE OF DATA COMMUNICATION AND SPEECH COMMUNICATION

BACKGROUND OF THE INVENTION (1) Field of the Invention

The present invention generally relates to a communication apparatus capable of data communications and speech communications using a telephone set, and more particularly to a communication apparatus selectively performing a reception procedure in a data communication or a process for outputting a ringing tone to call an operator in a speech communication in accordance with a received signal.

(2) Description of the Related Art

A facsimile machine which can selectively perform a facsimile communication which is a type of the data communications or a speech communication has been proposed. In this type of facsimile machine, the facsimile machine determines whether the communication required by a calling station is the facsimile communication or the speech communication in accordance with received signals. When the speech communication is required by the calling station, the facsimile machine outputs a ringing tone so as to call an operator. When the facsimile communication is required by the calling station, the facsimile carries out an automatic receiving process in the facsimile communication. In this type of facsimile machine, when the operator called by the ringing tone performs predetermined operations including an off-hook operation of the telephone set, the speech communication to the calling station can be carried out via the telephone set.

In the facsimile disclosed in Japanese Patent Laid Open Publication No. 62-260473, the type of communication required by the calling station is determined in the following manner.

After a called facsimile is connected with a line, a received signal is monitored for a predetermined time. When a calling tone signal (a CNG signal) is detected while monitoring the received signal, the reception procedure in the facsimile communication starts. On the other hand, when the CNG signal is not detected, the operator is called by a buzzer or the like.

The CNG signal is a signal transmitted first from the calling station in an automatic calling mode. However, a timing at which the CNG signal is transmitted varies in accordance with the type of calling facsimile machine. For example, one facsimile machine outputs the CNG signal immediately after a called facsimile is connected with the line. Another type of facsimile outputs the CNG signal a predetermined time, such as 10 seconds, after the called facsimile is connected with the line. Thus, the time required for monitoring the received signal must be long to always accurately detect the CNG signals transmitted from the various types of calling facsimiles.

When the speech communication is required by the calling station, a telephone set of the calling station is maintained in a silent state until the called operator responds to the call by using the telephone set. Thus, in the case where the time required for monitoring the received signal is long, the telephone set of the calling station is maintained in a silent state for a long time. In this case, a calling operator feels uneasy.

Conventionally, a facsimile machine disclosed in Japanese Patent Laid Open Publication No.2-7763 has been also proposed. In this type of facsimile machine, when the buzzer starts to be activated to call the operator after it is determined that the speech communication is required by the calling station, a predetermined signal tone is transmitted to the calling station.

However, as the telephone set of the calling station is maintained in the silent state until the conventional facsimile detects that the speech communication is required by the calling station, if the time for monitoring the received signal is made long in order to accurately detect the CNG signal, the telephone set is maintained in the silent state for a long time. Thus, in this case also, the calling operator feel uneasy.

SUMMARY OF THE INVENTION

Accordingly, a general object of the present invention is to provide a communication apparatus capable of a data communication and a speech communication in which the disadvantages of the aforementioned prior art are eliminated.

A more specific object of the present invention is to provide a communication apparatus capable of a data communication and a speech communication in which the type of communication required by a calling station can be accurately determined.

Another object of the present invention is to provide a communication apparatus capable of a data communication and a speech communication in which a calling operator can be prevented from feeling uneasy.

The above objects of the present invention are achieved by a communication apparatus comprising data communication means for executing data communications with a calling station and speech communication means for executing speech communications with the calling station, the communication apparatus further comprising: monitoring means for monitoring signals received by the communication apparatus; first determining means for determining, based on a result obtained by the monitoring means, whether or not a first signal transmitted from the calling station is received, the first signal indicating that the calling station requires the data communication; transmission means for transmitting a second signal to the calling station, the second signal indicating that the communication apparatus is ringing; first control means, coupled to the first determining means and the transmission means, for activating the transmission means in a case where the first determining means determines that the first signal is not received within a first time after the communication apparatus becomes capable of communicating to the calling station; ringing means for outputting a ringing tone; second control means, coupled to the ringing means, for activating the ringing means when a second time elapses from a time at which the transmission means starts to transmit the second signal, so that an operator hearing the ringing tone can activate the speech communication means; and third control means, coupled to the first determining means, for activating the data communication means when the first determining means determines that the first signal is received.

According to the present invention, as the communication apparatus is waiting to output the ringing tone until the second time elapses after the second signal is transmitted, it can be accurately determined that the calling station requires the speech communication. In addition, as the second signal is transmitted to the calling station before the ringing tone is output, a calling operator can soon know, based on the second signal transmitted from the communication apparatus, that the communication apparatus is normally operated. Thus, a calling operator can be prevented from feeling uneasy.

Additional objects, features and advantages of the present invention will become apparent from the following detailed description when read in conjunction with the accompanying drawings.

BRIEF DESCRIPTION OF THE DRAWINGS

FIGS. 2 and 3 are flow charts illustrating processes carried out in the facsimile machine shown in FIG. 1.

DESCRIPTION OF PREFERRED EMBODIMENTS

A description will now be given of a facsimile machine according to a first embodiment of the present invention with reference to FIGS. 1 through 6.

Figure 1:
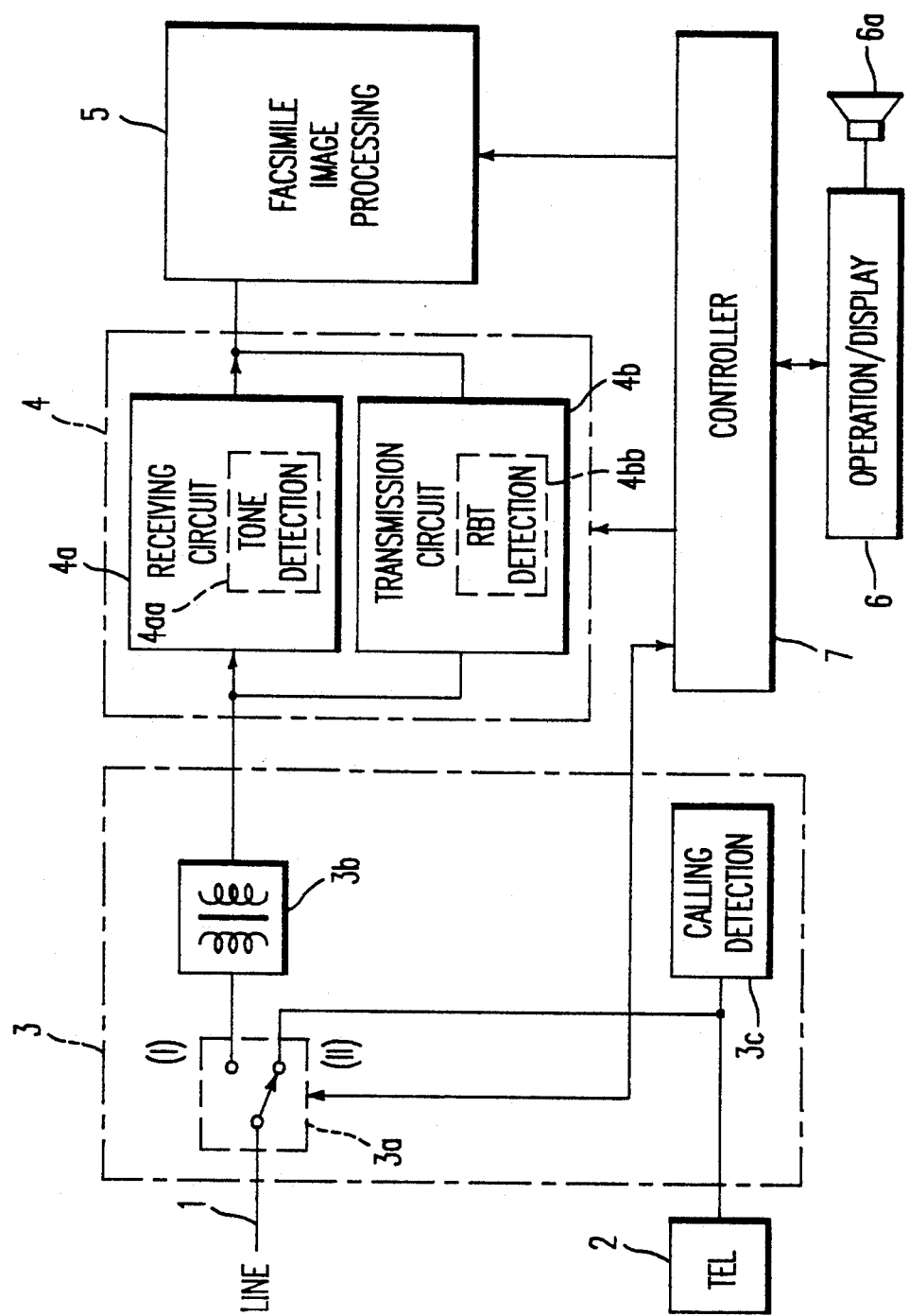
FIG. 1 is a block diagram illustrating a facsimile machine according to a first embodiment of the present invention.

Referring to FIG. 1, which shows a facsimile machine, a telephone line 1 and a telephone set 2 are connected to a network controller 3. The network controller 3 carries out network control processes when the facsimile calls a destination and is called by a calling station. The network controller 3, in addition, has a function for switching between a facsimile communication (the data communication) and a speech communication. In the facsimile communication, a modem 4 transmits and receives procedure signals used in a transmission control process and modulates and demodulates image signals. A facsimile image processing block 5 performs a predetermined image processing so that image information is printed out. In addition, the facsimile image processing block 5 reads out an image formed on a document and transmits image information. An operation/display block 6 is operated by an operator and displays information regarding processing states in the facsimile machine. The operation/display block 6 has a speaker 6a for outputting a ringing tone to call the operator. A controller 7 is formed of a microcomputer for controlling each of the parts of the facsimile machine.

In the network controller 3, the telephone line 1 is connected to a common terminal of a switching circuit 3a. A first terminal (I) of the switching circuit 3a is coupled to the modem 4 via a transformer 3b. A second terminal (II) of the switching circuit 3a is connected to the calling detection circuit 3c and the telephone set 2. The calling detection circuit 3c has a function for detecting a calling signal sent from the telephone line 1 when the facsimile is called. The modem 4 has a receiving circuit 4a for receiving various signals sent from the telephone line 1 and transmission circuit 4b for transmitting various signals to the telephone line 1. The receiving circuit 4a has a tone signal detection circuit 4aa for detecting signals of various frequencies. The tone signal detection circuit 4aa is used for determining whether or not the facsimile machine receives various procedure signals including the CNG signal. The transmission circuit 4b has a RBT transmission circuit 4bb for transmitting a predetermined tone signal as the pseudo-ring-back-tone signal.

Figure 2:
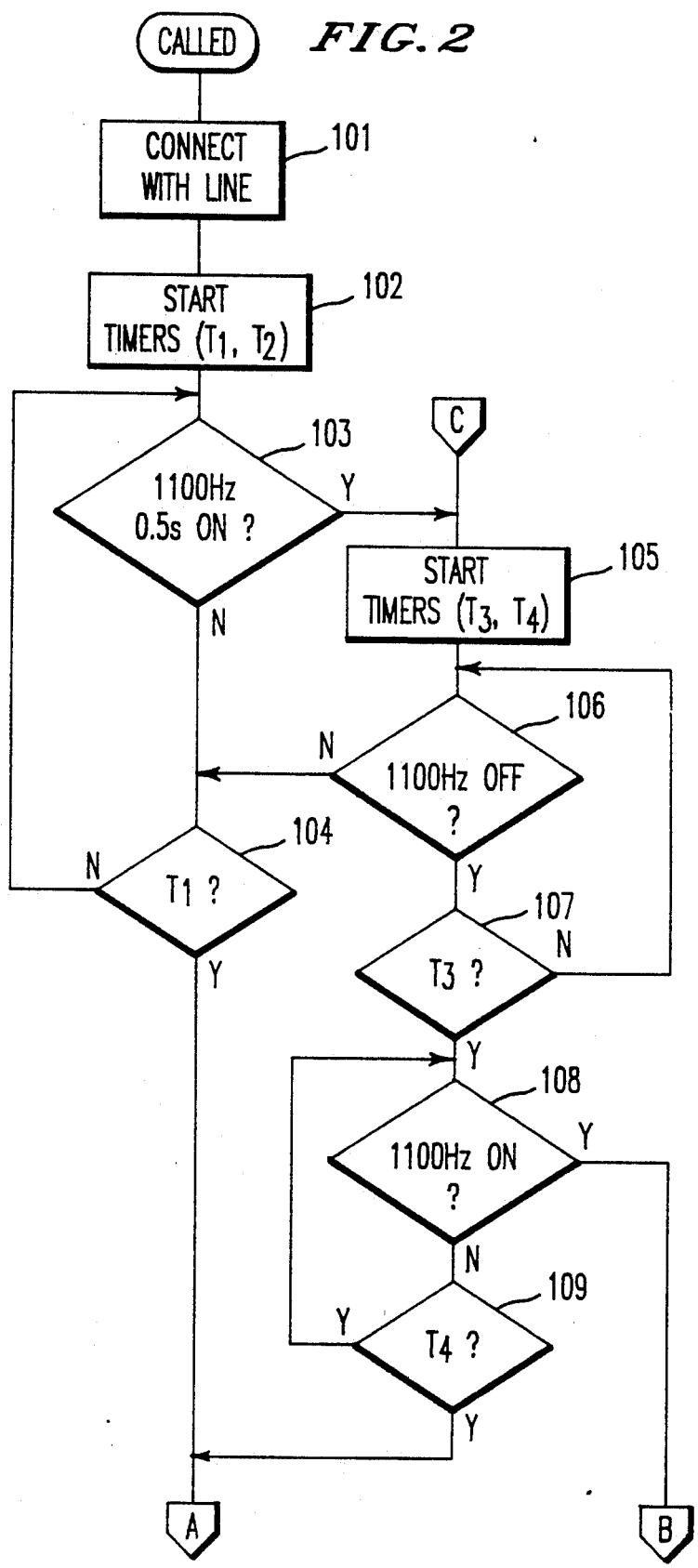

When the facsimile machine having the above structure is called by the calling station, processes shown in FIGS. 2 and 3 are sequentially carried out.

When the facsimile machine is waiting to be called, the switching circuit 3a selects the second terminal (II) connected to the telephone set 2. In this state, when the facsimile machine is called, a process shown in FIG. 2 starts.

Referring to FIG. 2, step 101 connects the facsimile machine with the telephone line 1. Then step 102 activates a first timer ($T_1$) and a second timers ($T_2$) so that the first and second timer start. The first timer and second timer are respectively used for monitoring times $T_1$ and $T_2$. After this, step 103 determines whether or not a tone signal turned on at 1000 Hz for 500 msec., referred to as the CNG signal, is received, and step 104 determines whether or not the time $T_1$ is over in the first timer. That is, the facsimile machine monitors during time $T_1$ whether or not the CNG signal is received.

Figure 4A:
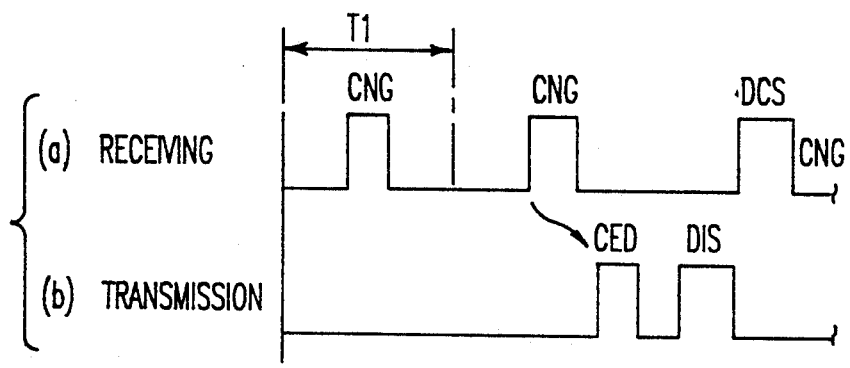
FIGS. 4A, 4B and 4C are timing charts illustrating reception procedures in various cases.

The CNG signal is formed of a toned signal of 1100 Hz turned on and off. In the CCITT, a turn-on time of the CNG signal is defined as 500 msec.±15% and a turn-off thereof is defined as 3000 msec.±15%. Thus, the CNG signal is periodically transmitted at a period of 3.5 sec. in general. In the first embodiment, the time $T_1$ for which the reception of the CNG signal is monitored is equal to or greater than 3.5 sec. which is the period of the CNG signal. Thus, in a case where the calling station is a normal facsimile machine carrying out the automatic calling process, the CNG signal is received within the time $T_1$ after the facsimile machine is connected with the telephone line 1, as shown in FIG. 4A.

When step 103 determines that the CNG signal which is the tone signal of 1100 Hz turned on for 500 msec. is received, step 105 activates a third timer ($T_3$) and a fourth timer ($T_4$) so that the third and fourth timers start. The third timer and fourth timer are respectively used for monitoring times $T_3$ and $T_4$. The times $T_3$ and $T_4$ are set, for example, at 4 sec. Then step 106 determines whether or not the tone signal of 1100 Hz is turned off, and step 107 whether or not the time $T_3$ is over in the third timer. That is, the facsimile machine monitors for the time $T_3$ whether or not the tone signal is turned off. If the CN signal is received, the tone signal (the CNG signal) is turned on again after the tone signal has been turned off for the time $T_3$.

When step 107 determines that the time $T_3$ is over in the third timer, step 108 determines whether or not the tone signal of 1100 Hz is turned on again, and step 109 determines whether the time $T_4$ is over in the fourth timer. That is, the facsimile machine monitors for the time $T_4$ whether or not the tone signal is turned on again. When the tone signal of 1100 Hz is turned on again, the facsimile machine determines that the CNG signal is received. Then known receiving procedures are executed. That is, the facsimile machine transmits a CED signal (Called Station Identification) and a DIS signal (Digital Identification Signal), as shown in FIG. 4A (b). Then, when the facsimile machine receives a DCS signal (Digital Command Signal), as shown in FIG. 4A (a), predetermined receiving procedures are executed in step 110 shown in FIG. 3.

On the other hand, in a case where a calling station transmits the CNG signal after the time $T_1$ is over in the first timer, the process is carried out as follows.

Figure 4B:
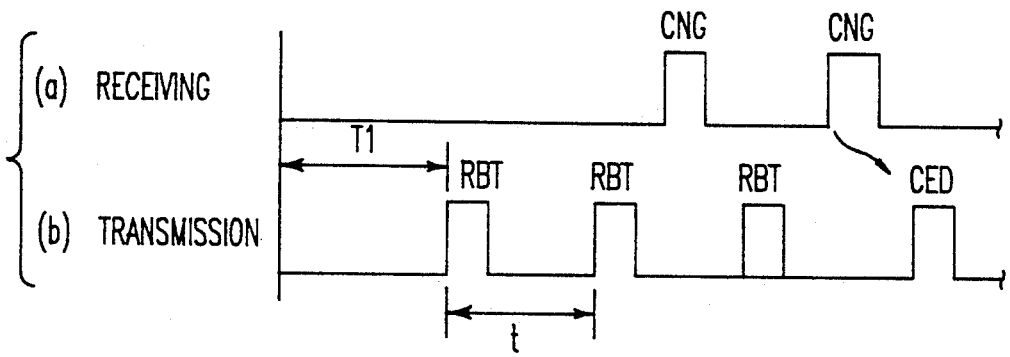

In this case, step 104 determines that the time $T_1$ is over in the first timer under a condition in which step 103 determines that the tone signal is turned off. Then the process proceeds to step 111 shown in FIG. 3. Step 111 transmits a pseudo-ring-back-tone signal (a pseudo-RBT signal) as shown in FIG. 4B (b). The pseudo-RBT signal is a tone signal periodically turned on and off at a period t. The pseudo-RBT signal has, for example, the same tone as a ring back tone signal used in a normal telephone network. After step 111 step 112 determines whether or not the tone signal of 1100 Hz turned on for 500 msec is received, and step 113 determines whether or not the time $T_2$ is over in the second timer. That is, the facsimile machine monitors for the time $T_2$ whether or not the tone signal is received. The process for monitoring the received signal for the time $T_2$, which is formed of steps 112 and 113, is carried out while the pseudo-RBT signal is turned off. When step 112 determines that the tone signal of 1100 Hz turned on for 500 msec. (the CNG signal) is received before the time $T_2$ is over in the second timer, step 114 stops to transmit the pseudo-RBT signal. After this, the process returns to step 105 and the steps after step 105 are carried out in the same manner as those described above. Thus, the receiving procedures start when the CNG signal is turned on again, as shown in FIG. 4B.

In a case where the calling station is operated in a manual transmission mode or the calling is carried out by the telephone set for the speech communication, the calling station does not transmit the CNG signal.

Figure 4C:
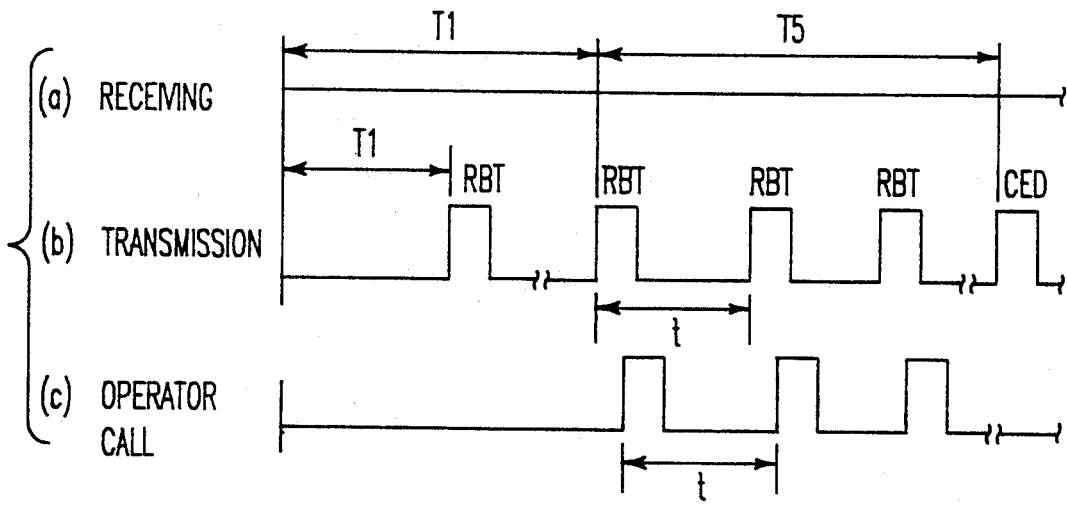

In this case, step 113 determines that the time $T_2$ is over in the second timer in a state where the CNG signal is not received, and then step 115 activates a fifth timer for monitoring a time $T_5$. Step 116 starts to output a ringing tone signal so that the speaker 6a of the operation/display block 6 outputs the ringing tone, as shown in FIG. 4C (c). The ringing tone signal is periodically turned on and off at a period t in the same manner as the pseudo-RBT signal. After that, step 117 determines whether or not an operation for stopping to output the ringing tone signal is carried out in the operation/display block 6, and then step 118 determines whether or not the time $T_5$ is over in the fifth timer. That is, the facsimile machine monitors for the time $T_5$ whether or not the operation for stopping to output the ringing tone signal. When the operator hears the ringing tone output by the speaker 6a, the operator carries out an off-hook of the telephone set 2 and the operation for stopping to output the ringing tone. When the operation for stopping to output the ringing tone is carried out before the time $T_5$ is over in the fifth timer, step 119 stops to transmit the pseudo-RBT signal and to output the ringing tone signal. Then step 120 switches the switching circuit 3a from the first terminal (I) to the second terminal (II) so that the telephone set 2 is connected with the telephone line 1. As a result, the operator can carry out the speech communication to the calling station.

When the calling station requires the facsimile communication in the manual transmission mode, predetermined receiving procedures are carried out. In this case, the facsimile machine switches the switching circuit 3a from the second terminal (II) to the first terminal (I) so that the the modem 4 is connected to the telephone line 1 via the transformer 3b. Then the receiving procedures are executed.

On the other hand, when the operator is off, the operation for stopping to output the ringing tone signal is not carried out. In this case, when step 118 determines that the time $T_5$ is over in the fifth timer, step 110 starts the receiving procedures in the facsimile communication, as shown in FIG. 4C (b). As a result, in a case where the calling station requires the facsimile communication, even if the called operator is off, the facsimile communication between the calling station and the called facsimile machine can be carried out.

Figure 5:
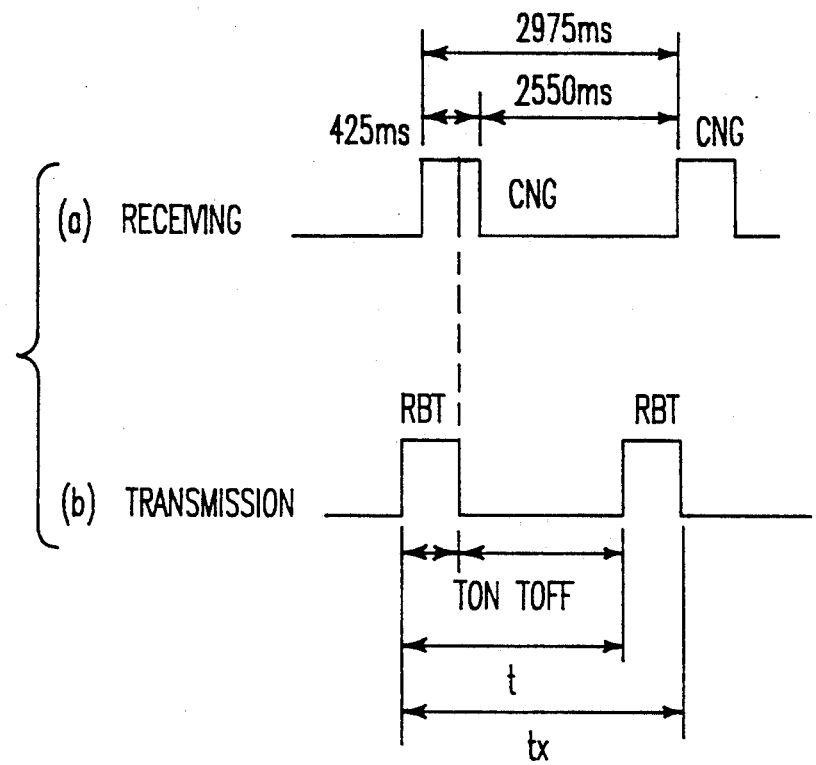
FIG. 5 is a timing chart illustrating timings at which a CNG signal and a pseudo-ring-back-tone are turned on and off.

There is a case where the CNG signal is received under a condition in which the pseudo-RBT signal is turned on, as shown in FIG. 5. In the first embodiment, since the facsimile machine monitors whether or not the CNG signal is received in an off-period of the pseudo-RBT signal, the CNG signal overlapping with the pseudo-RBT signal which is turned on cannot be detected. As the on-time of the CNG signal is defined as 500 msec.±15%, the minimum on-time of the CNG signal is 425 msec. As the off-time of the CNG signal is defined as 3000 msec.±15%, the minimum off-time of the CNG signal is 2550 msec. Thus, the minimum period of the CNG signal is 2975 msec. In the first embodiment, the on-time $t_{on}$ of the pseudo-RBT signal is set, for example, at 600 msec. and the off-time $t_{off}$ thereof is set, for example, at 1700 msec. In this case, the time $t_x$ for which the pseudo-RBT signal is turned on and off twice is 2900 msec. In a case where the time $t_x$ of the pseudo-RBT signal is less than the minimum period of the CNG signal as described above, even if the on-timing of the pseudo-RBT signal overlaps a timing at which the CNG signal is received, the pseudo-RBT is always turned off at the next timing at which the CNG signal is received. Thus, the CNG signal can be detected.

Signals of 1100 Hz can be included in a speech of the calling operator, noises and the like. However, since the facsimile machine according to the first embodiment determines that the CNG signal is detected only when the signal of 1100 Hz is turned on and off and turned on again, it can be quickly and accurately determined that the CNG signal is received.

In addition, when the signal of 1100 Hz turned on for 500 msec. is detected within the time $T_1$, the transmission of the pseudo-RBT signal is stopped until the signal of 1100 Hz is turned on at the next time. Thus, even if the calling station has a function for stopping output of the the CNG signal when signals other than a facsimile signal are received, the CNG signal is prevented from stopping to be output.

Further, since the facsimile machine monitors whether or not the CNG signal is received after the pseudo-RBT signal starts to be transmitted, even if the calling station is a facsimile machine in which a timing at which the CNG signal starts to be output is late, the facsimile communication can be executed.

In the first embodiment, a circuit in the modem 4 is used, in time sharing, as the tone detection circuit 4aa for detecting the CNG signal and the RBT transmission circuit 4bb for transmitting the pseudo-RBT signal.

The time $T_2$ in the second timer is a time required for determining whether or not the calling station requires the facsimile communication in the automatic transmission mode. The time $T_5$ in the fifth timer is a time for which the operator is called. When the operator does not respond to the calling, the facsimile machine transmits the CED signal after the time obtained by addition of $T_2$ and $T_5$ and then the receiving procedures are carried out. In this case, the CED signal must be transmitted within 30 sec. after the facsimile machine is connected with the telephone line 1, in accordance with the CCITT recommendation. Thus, the time $T_2$ is set, for example, at 12 sec., and the time $T_5$ is set, for example, at 18 sec.

Figure 6:
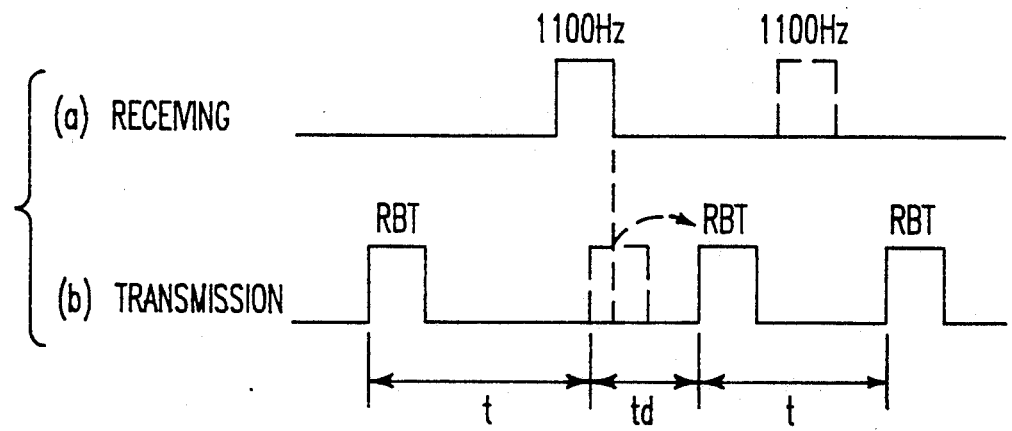
FIG. 6 is a timing chart illustrating another timing at which the ring back tone is transmitted.

In the first embodiment, when the signal of 1100 Hz is detected, the transmission of the pseudo-RBT signal is stopped for a time required for determination that the detected signal of 1100 Hz is not the CNG signal. However, the pseudo-RBT signal can also be continuously transmitted when the signal of 1100 Hz is detected. In this case, when the calling station requires the speech communication, the calling operator does not feel incongruity. In a case where the pseudo-RBT signal is continuously transmitted when the signal of 1100 Hz is detected, there is a case where a timing at which the signal of 1100 Hz is detected overlaps a timing at which the pseudo-RBT signal is turned on, as shown in FIG. 6. In this case, the timing at which the pseudo-RBT signal is turned on is delayed. A delay time $t_d$ is set at a predetermined time so that the pseudo-RBT signal is turned off at a timing when the signal of 1100 Hz detected as the CNG signal is turned on again.

A voice message signal can be substituted for the tone signal such as the pseudo-RBT signal.

A description will now be given of a second embodiment of the present invention with reference to FIGS. 7, 8, and 9. In the second embodiment, when the calling station requires the speech communication or the facsimile communication in the manual transmission mode, the communication can be rapidly achieved.

Figure 7:
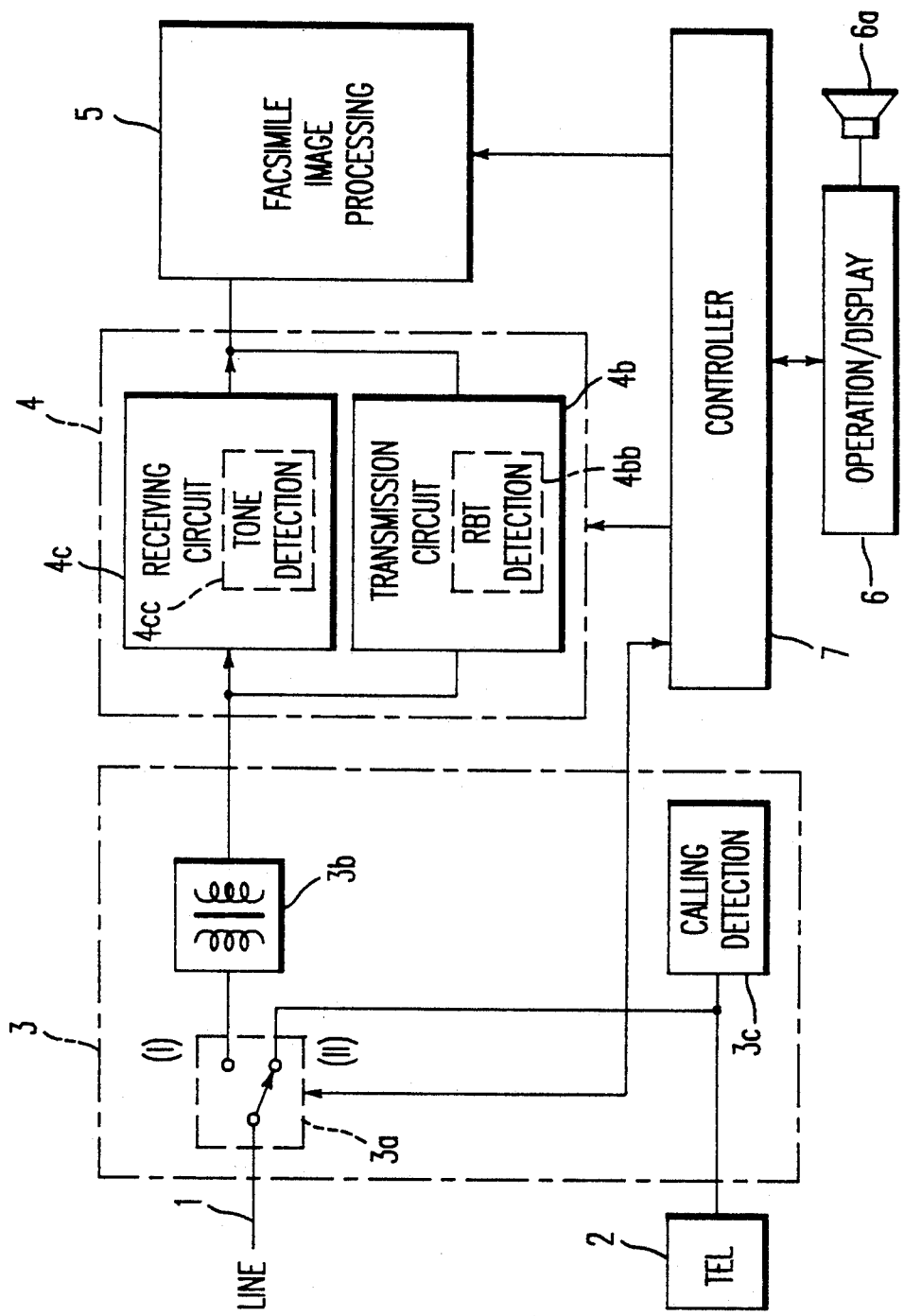
FIG. 7 is a block diagram illustrating a facsimile machine according to a second embodiment of the present invention.

FIG. 7 shows a facsimile machine according to the second embodiment of the present invention. In FIG. 7, those parts which are the same as those shown in FIG. 1 are given the same reference numbers.

In FIG. 7, a receiving circuit 4c in the modem 4 includes a tone detection circuit 4cc. The tone detection circuit 4cc has a function for detecting the CNG signal and another function for detecting voice signals. When the facsimile machine having the tone detection circuit 4cc is called, the facsimile machine is operated in accordance with flow charts shown in FIG. 8 and 9.

When the facsimile machine is waiting to be called, the second terminal (II) of the switching circuit 3a is connected to the telephone line 1. When the facsimile is called, step 201 switches the switching circuit 3a from the second terminal (II) to the first terminal (I) so that the facsimile machine is connected with the telephone line 1. Then step 202 activates a first timer ($T_1$) and a second timer ($T_2$) so that the first and second timer start. The first timer and second timer are respectively used for monitoring times $T_1$ and $T_2$. After this, step 203 determines whether or not the CNG signal or voice signals are received, and step 204 determines whether or not the time $T_1$ is over in the first timer. That is, the tone detection circuit 4cc monitors for the time $T_1$ whether or not the CNG signal or the voice signals are received. When neither the CNG signal nor the voice signals are received for the time $T_1$, step 205 starts to transmit the pseudo-RBT signal. Then step 206 activates a Tr-off timer so that the Tr-off timer starts. The Tr-off timer is used for measuring the off-time of the pseudo-RBT signal which is periodically turned on and off at a period t. Step 207 determines whether or not the CNG signal is received and step 208 determines whether or not a Tr-off time set in the Tr-off timer is over. That is, the facsimile machine monitors for the Tr-off time whether or not the CNG signal is received. A process including steps 205, 206, 207 and 208 are repeatedly carried out until step 209 determines that the time $T_2$ is over in the second timer.

Figure 9:
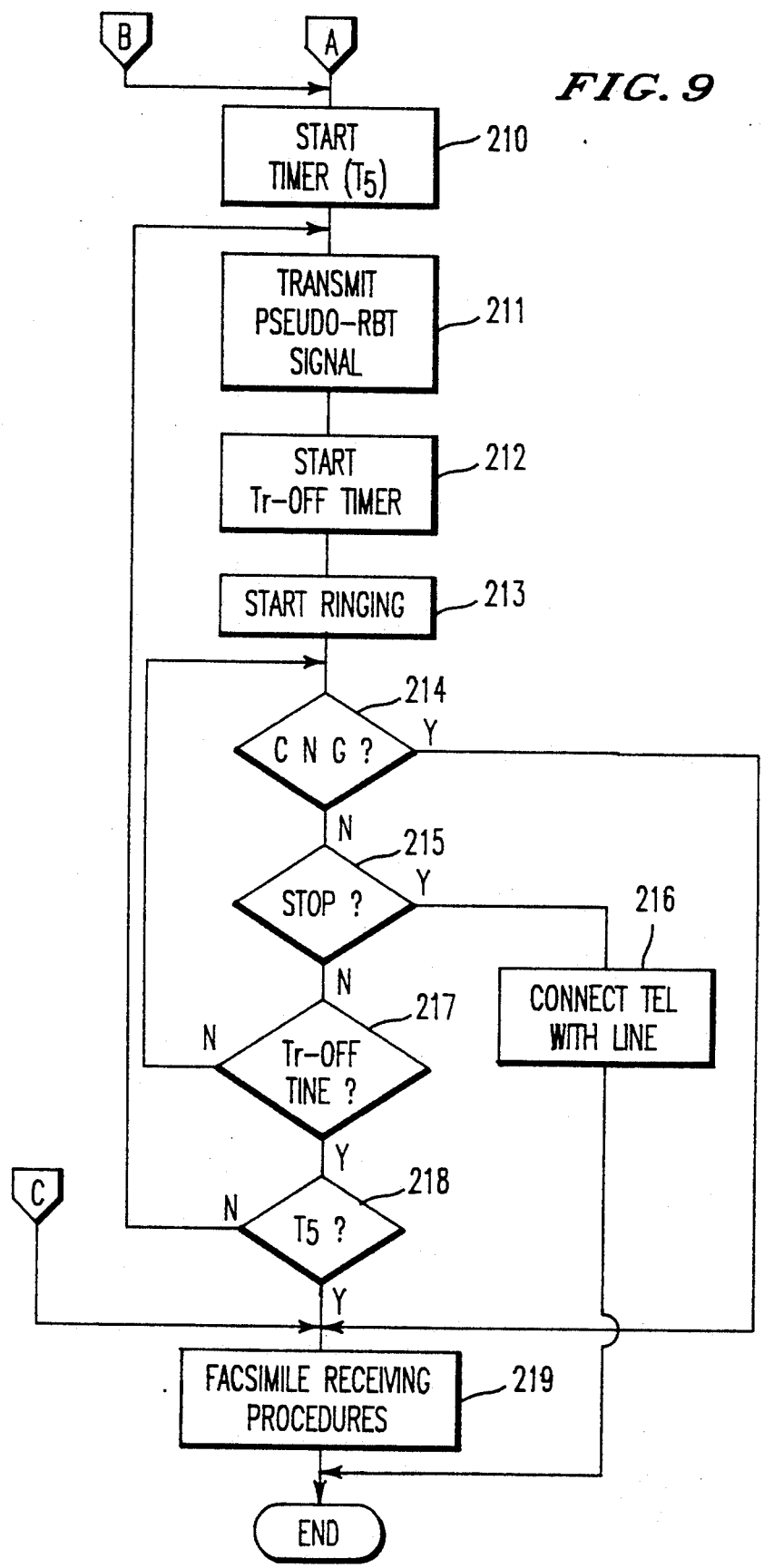

When the time $T_2$ is over in the second timer under a condition in which the CNG signal is not detected, step 210 shown in FIG. 9 activates a fifth timer ($T_5$) so that the fifth timer starts. After this, step 211 continuously transmits the CNG signal and step 212 activates the Tr-off timer so that the Tr-off timer starts. Then step 213 starts to output a ringing tone signal to call an operator so that the speaker 6a of the operation/display block 6 outputs the ringing tone in synchronism with the pseudo-RBT signal. In a state where the ringing tone is output from the speaker 6a, when step 214 determines whether or not the CNG signal is received. That is, the facsimile machine is continuously monitoring for the time $T_5$ whether or not the CNG signal is received. When step 214 determines that the CNG signal is received, step 219 carries out facsimile receiving procedures. The facsimile machine transmits the CED signal, the DIS signal and receives the DCS signal transmitted from the calling station, in the facsimile receiving procedures.

On the other hand, when step 214 determines that the CNG signal is not received, step 215 determines whether or not an operation for stopping output of the ringing tone signal is carried out by the operator. When the operator hearing the ringing tone output from the speaker 6a carries out an off-hook operation of the telephone set 2 and operates a stop key, step 215 determines that the operation for stopping output of the ringing tone is carried out. In this case, the facsimile machine stops transmitting the pseudo-RBT signal and output of the ringing tone signal (calling the operator). Then step 216 switches the switching circuit 3a from the first terminal (I) to the second terminal (II) so that the telephone set 2 is connected with the telephone line 1. In a state where the telephone set is connected with the telephone line 1, the speech communication between the called facsimile machine and the calling station is performed via the telephone set 2. In a case where the calling station requires the facsimile communication in the manual transmission mode, predetermined receiving operations are carried out. In this case, the facsimile machine switches the switching circuit from the second terminal (II) to the first terminal (I) so that the modem is connected with the telephone line 1 via the transformer 3b. Then the receiving procedures are carried out.

When the operation for stopping output of the ringing tone signal is not carried out, step 217 determines whether or not the Tr-off time is over. When step 217 determines that the Tr-off time is over under a condition in which the the operation for stopping output of the ringing tone signal, step 218 determines whether or not the time $T_5$ is over in the fifth timer. When step 218 determines that the time $T_5$ is over in the fifth timer, step 219 carries out the facsimile receiving procedures.

Figure 8:
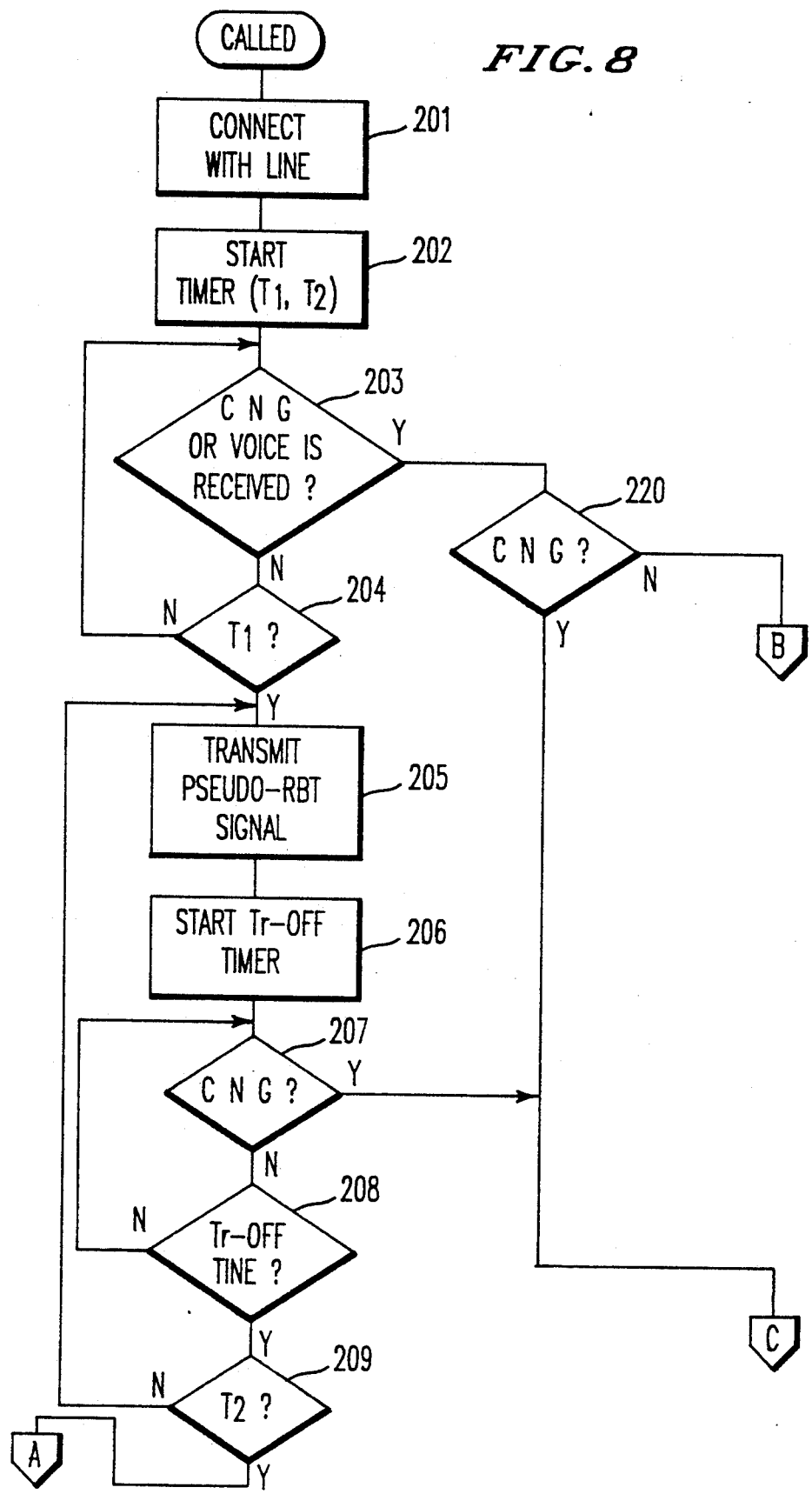
FIGS. 8 and 9 are flow charts illustrating process carried out in the facsimile machine shown in FIG. 7.

After the facsimile machine is connected with the telephone line 1, when step 203, shown in FIG. 8, determines that the CNG signal or the voice signals is received within the the time $T_1$, step 220 determines whether or not a received signal is the CNG signal. When step 220 determines that the the CNG signal is detected, the process proceeds to step 219, so that the facsimile receiving procedures are carried out. On the other hand, when the calling station requires the facsimile communication in the manual transmission mode or the speech communication, the result obtained in step 203 is YES and the result obtained in step 220 is NO. In this case, the process immediately proceeds to step 210. As a result, step 210 activates the fifth timer ($T_5$) for monitoring the time $T_5$, step 211 starts to transmit the pseudo-RBT signal and step 213 starts to output the ringing tone signal so that the speaker 6a of the operation/display block 6 outputs the ringing tone. When the operator carries out the off-hook of the telephone set 2 and the operates the stop key, the telephone is connected with the telephone line 1 in the same manner as the case described above. In this case, the speech communication between the called facsimile machine and the calling station via the telephone set 2. In a case where the calling station requires the facsimile communication in the manual transmission mode, the called operator carries out the predetermined receiving operations.

When the time $T_5$ is over in the fifth timer under a condition in which the operation for stopping to output the ringing tone signal is not carried out, the facsimile machine carries out the facsimile receiving procedures.

In the second embodiment, when the facsimile machine detects the voice signal corresponding to "Hello" which is normally spoken by the calling operator in the speech communication or the facsimile communication in the manual transmission mode, the ringing tone is immediately output from the speaker 6a. Thus, the called operator can rapidly respond to the calling for the speech communication and the facsimile communication in the manual transmission mode.

A description will now be given of a third embodiment of the present invention with reference to FIG. 10. In the third embodiment, either a mode (TEL) in which the speech communication is prior to the facsimile communication or a mode (FAX) in which the facsimile communication (in the automatic transmission mode) is prior to the speech communication can be selected. In a time zone in which the telephone line 1 is frequently used for the speech communication, the mode (TEL) is selected. On the other hand, in a time zone in which the telephone line 1 is frequently used for the facsimile communication, the mode (FAX) is selected.

The facsimile machine according to the third embodiment is similar to that shown in FIG. 1. A selector switch for selecting either the mode (TEL) o the mode (FAX) is provided in the operation/display block 6 shown in FIG. 1.

Figure 10:
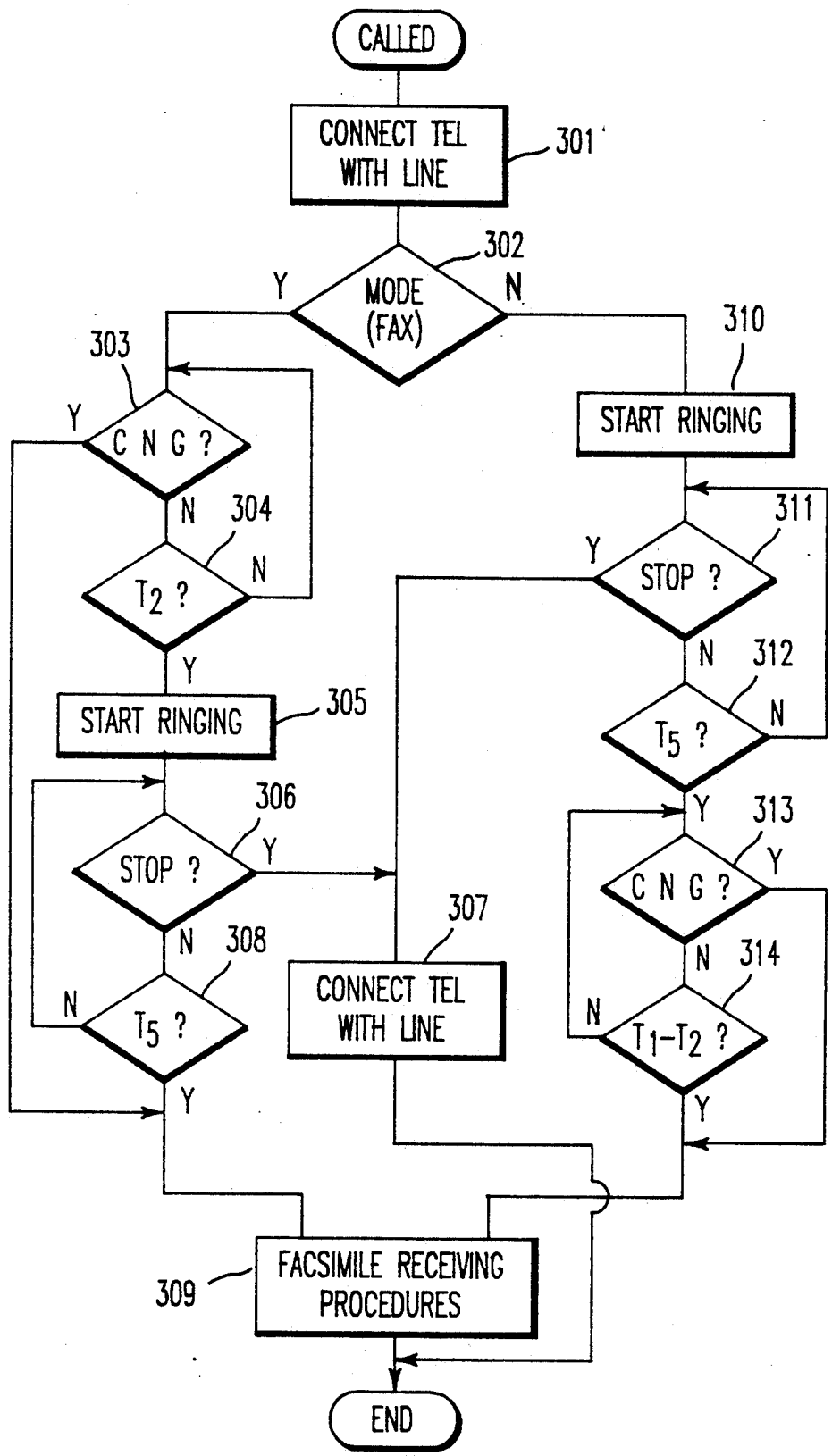
FIG. 10 is a flow chart illustrating process carried out in a facsimile machine according to a third embodiment of the present invention.

When the facsimile machine is called, processes shown in FIG. 10 are carried out.

When the facsimile machine is waiting to be called, the switching circuit 3a selects the second terminal (II) connected to the telephone set 2. When the facsimile machine is called, step 301 switches the switching circuit 3a from the second terminal (II) to the first terminal (I) so that the modem 4 is connected with the telephone line 1 via the transformer 3b. Then step 302 determines which is selected the mode (TEL) or the mode (FAX). In a case where the selector switch selects the mode (FAX) in which the facsimile communication is prior to the speech communication, the result obtained in step 302 is YES. In this case, the tone detection circuit 4aa monitors for the time $T_1$ whether or not the CNG signal is received. When the CNG signal is not received, the pseudo-RBT signal is transmitted for the time $T_2$ and the monitoring of the CNG signal is carried out (steps 303 and 304). When step 304 determines that the time $T_2$ is over under a condition in which the CNG signal is not received, the ringing tone is output for the time $T_5$ from the speaker 6a of the operation/display block 6 in synchronism with the pseudo-RBT signal (steps 305, 306a nd 308), so that the operator is called. When the operator hearing the ringing tone carries out the off-hook of the telephone set 2 and operates the stop key (step 306), the telephone 2 is connected with the telephone line 1 (step 307). As a result, the speech communication between the called facsimile machine and the calling station can be performed. In addition, when the calling station requires the facsimile communication in the manual transmission mode, the predetermined receiving operations are carried out.

The facsimile machine monitors whether or not the CNG signal is received while the ringing tone is output from the speaker 6a. Then when the CNG signal is detected in a state where the pseudo-RBT signal is turned off, the facsimile receiving procedures are carried out.

When the time $T_5$ is over under a condition in which the stop key is not operate (steps 306 and 308), the facsimile receiving procedures are carried out in step 309.

On the other hand, when the selector switch selects the mode (TEL), the result obtained in step 302 is NO. In this case, first the facsimile machine starts to output the ringing tone signal for the time $T_5$ so that the speaker 6a of the operation/display block 6 outputs the ringing tone in synchronism with the pseudo-RBT signal (step 310). When the operator hearing the ringing tone carries out the off-hook of the telephone set 2 and operates the stop key (step 311), the telephone set 2 is connected with the telephone line 1 (step 307). As a result, the speech communication can be carried out. When the calling station requires the facsimile communication in the manual transmission mode, the predetermined receiving operations are carried out.

The facsimile machine monitors whether or not the CNG signal is received while the ringing tone is output from the speaker 6a. In this state, when the CNG signal is detected under a condition in which the pseudo-RBT signal is turned off, the facsimile receiving procedures are carried out.

When the time $T_5$ is over under a condition in which the the stop key is not operated (steps 311 and 312), the facsimile machine transmits the pseudo-RBT signal for the time $T_2$ and monitors whether or not the CNG signal is received (steps 313 and 314). When the CNG signal is detected within the time $T_1-T_2$, the facsimile receiving procedures are carried out in step 309.

According to the third embodiment, either the mode (TEL) in which the speech communication is prior to the facsimile communication or the mode (FAX) in which the facsimile communication is prior to the speech communication can be selected in accordance with a type of communication frequently required from calling stations. Thus, the telephone line can be effectively used.

In the third embodiment, the mode (TEL) and the mode (FAX) are respectively selected by the selector switch. The mode can also be automatically switched from one to another at a predetermined time by using a timer.

Figure 11:
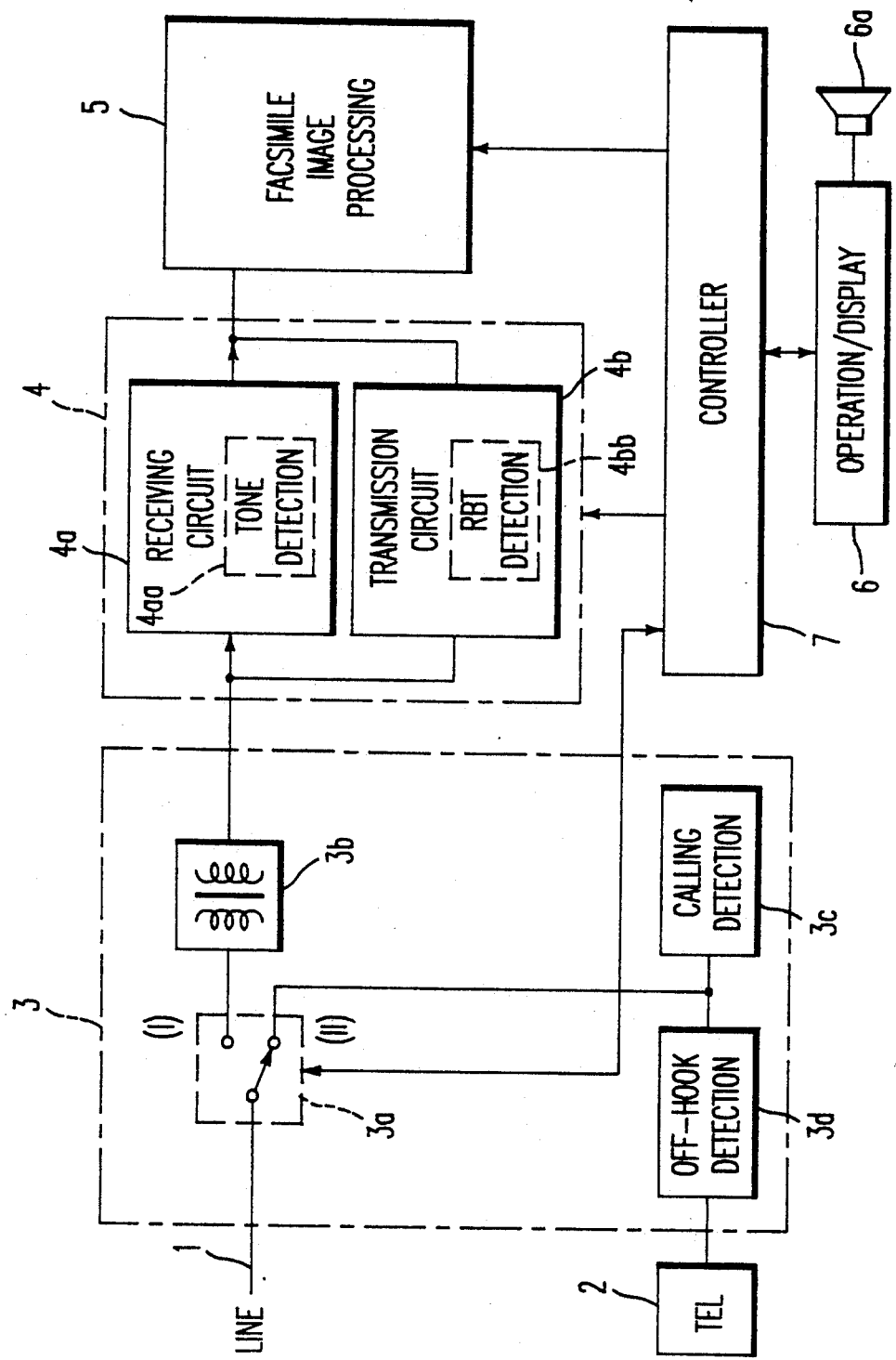
FIG. 11 is a block diagram illustrating a facsimile machine according to a modification of the first embodiment of the present invention.

A description will now be given of a modification of the first embodiment with reference to FIGS. 11, 12 and 13. In FIG. 11, those parts which are the same as those shown in FIG. 1 are given the same reference numbers.

Referring to FIG. 11, which shows a structure of the facsimile machine, the network controller 3 includes an off-hook detection circuit 3d. The off-hook detection circuit 3d outputs a detection signal when the telephone set 2 is in an off-hook state. The detection signal output from the off-hook detection circuit 3d is supplied to the controller 7. The second terminal (II) of the switching circuit 3a is coupled to the telephone sent 2 via the off-hook detection circuit 3d.

Figure 12:
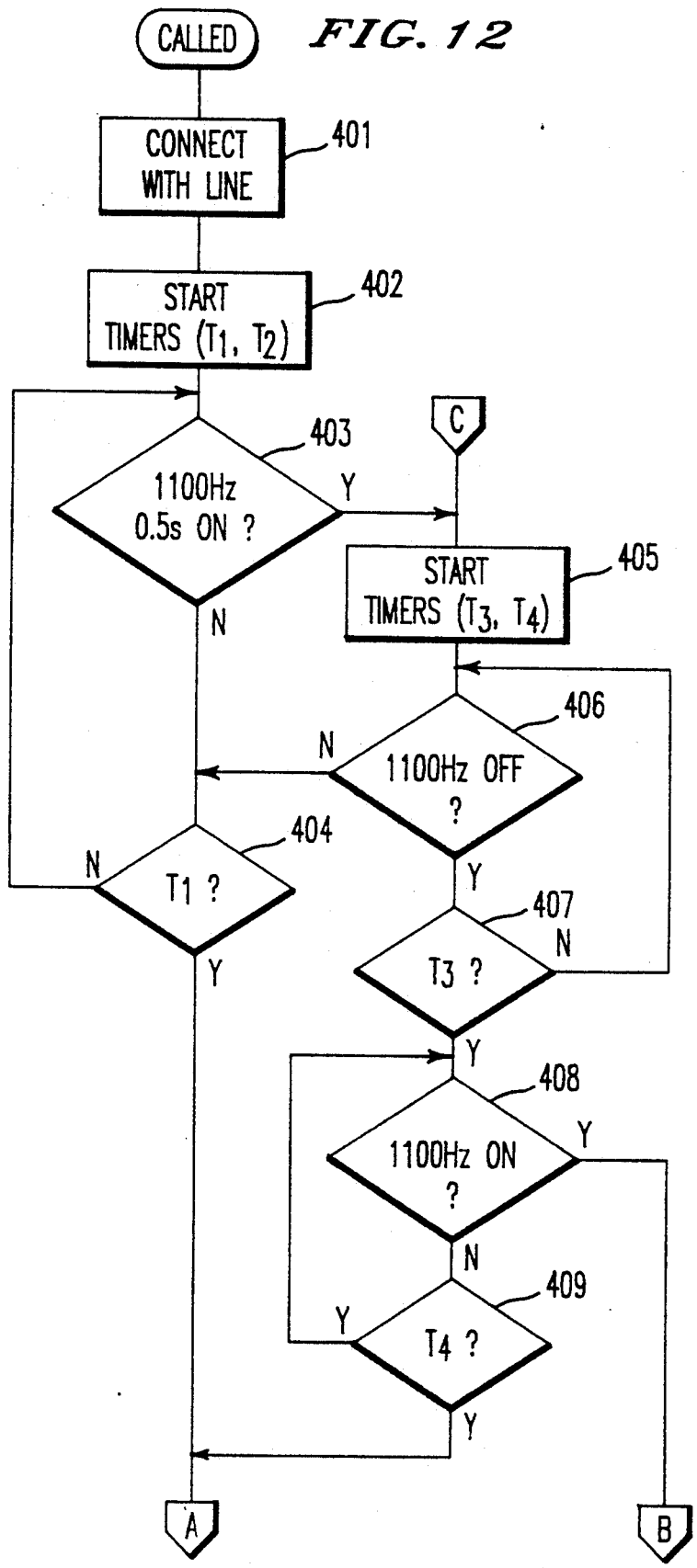
FIGS. 12 and 13 are flow charts illustrating processes carried out in the facsimile machine shown in FIG. 11.
Figure 13:
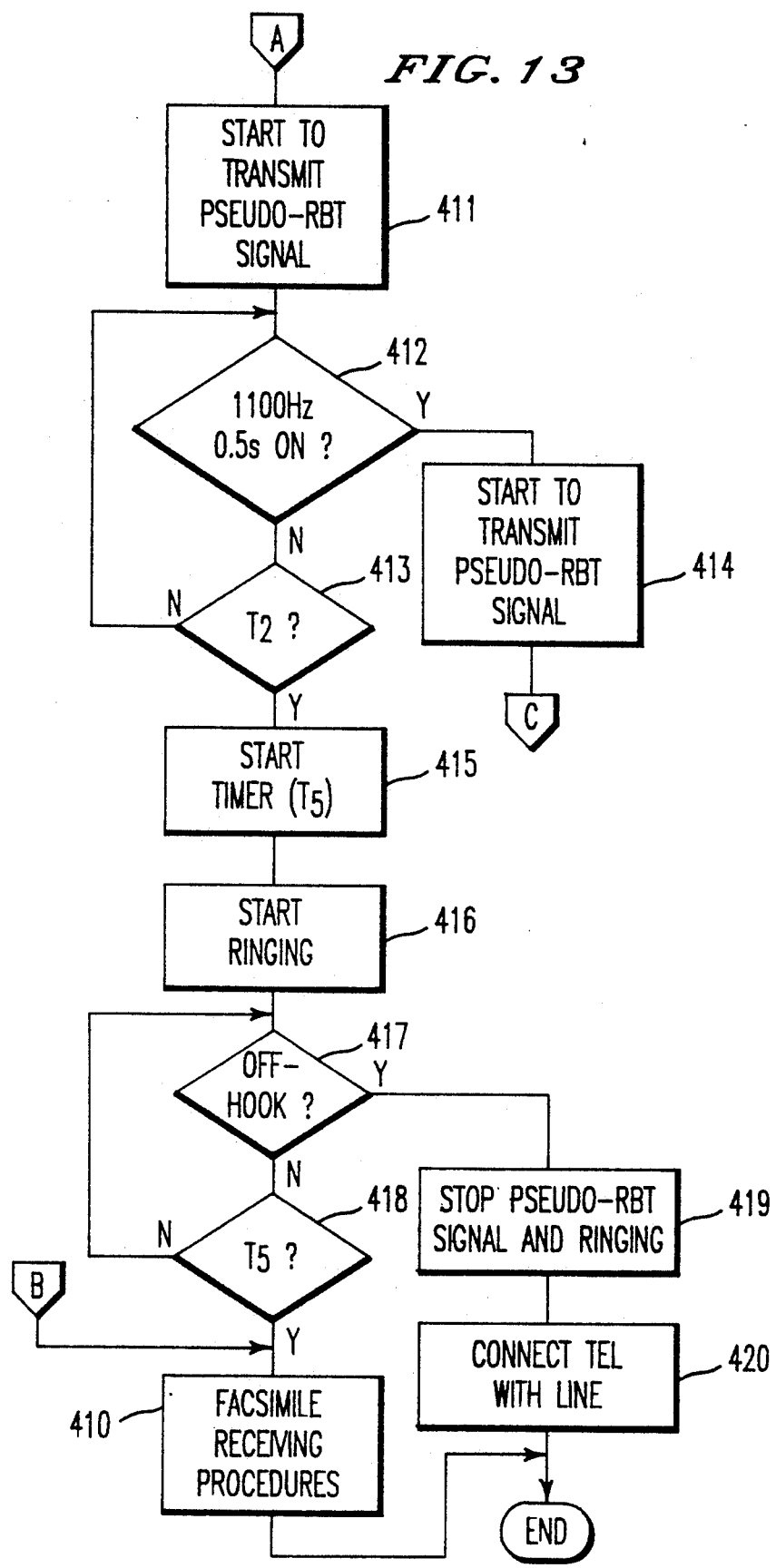

When the facsimile machine is called, the facsimile machine carries out processes shown in FIGS. 12 and 13. The process shown in FIG. 12 has the same steps as corresponding to those shown in FIG. 2. The process shown in FIG. 13 has almost the same steps as those shown in FIG. 3. In the modification of the first embodiment, contents in step 417 shown in FIG. 13 differ from those in the corresponding step 117 shown in FIG. 3. In FIG. 13, after step 416 corresponding to step 116 outputs the ringing tone, step 417 determines whether or not the telephone set 2 is in the off-hook state, and then step 418 corresponding to step 118 determines whether or not the time $T_5$ is over in the fifth timer. That is, the facsimile machine monitors for the time $T_5$ whether or not the off-hook of the telephone set 2 is carried out. When the operator hearing the ringing tone carries out the off-hook of the telephone set 2, the off-hook detection circuit 3d outputs the detection signal. When step 417 determines, based on the detection signal supplied from the off-hook detection circuit 3d, that the telephone set is in the off-hook, step 419 corresponding to step 119 stops transmitting the pseudo-RBT signal and to output the ringing tone signal. Then step 420 corresponding to step 120 switches the switching circuit 3a from the first terminal (I) to the second terminal (II) so that the telephone set 2 is connected with the telephone line 1.

On the other hand, when step 418 determines that the time $T_5$ is over under a condition in which the off-hook detection circuit does not output the detection signal, step 410 carries out the facsimile receiving procedures in the same manner as a corresponding step 110 shown in FIG. 3.

In the above modification, when the off-hook of the telephone set 2 is detected, the facsimile machine automatically stops transmitting the pseudo-RBT signal and output of the ringing tone. That is, it is unnecessary for the operator to operate the stop key to stop transmitting the pseudo-RBT signal and output of the ringing tone.

Figure 14:
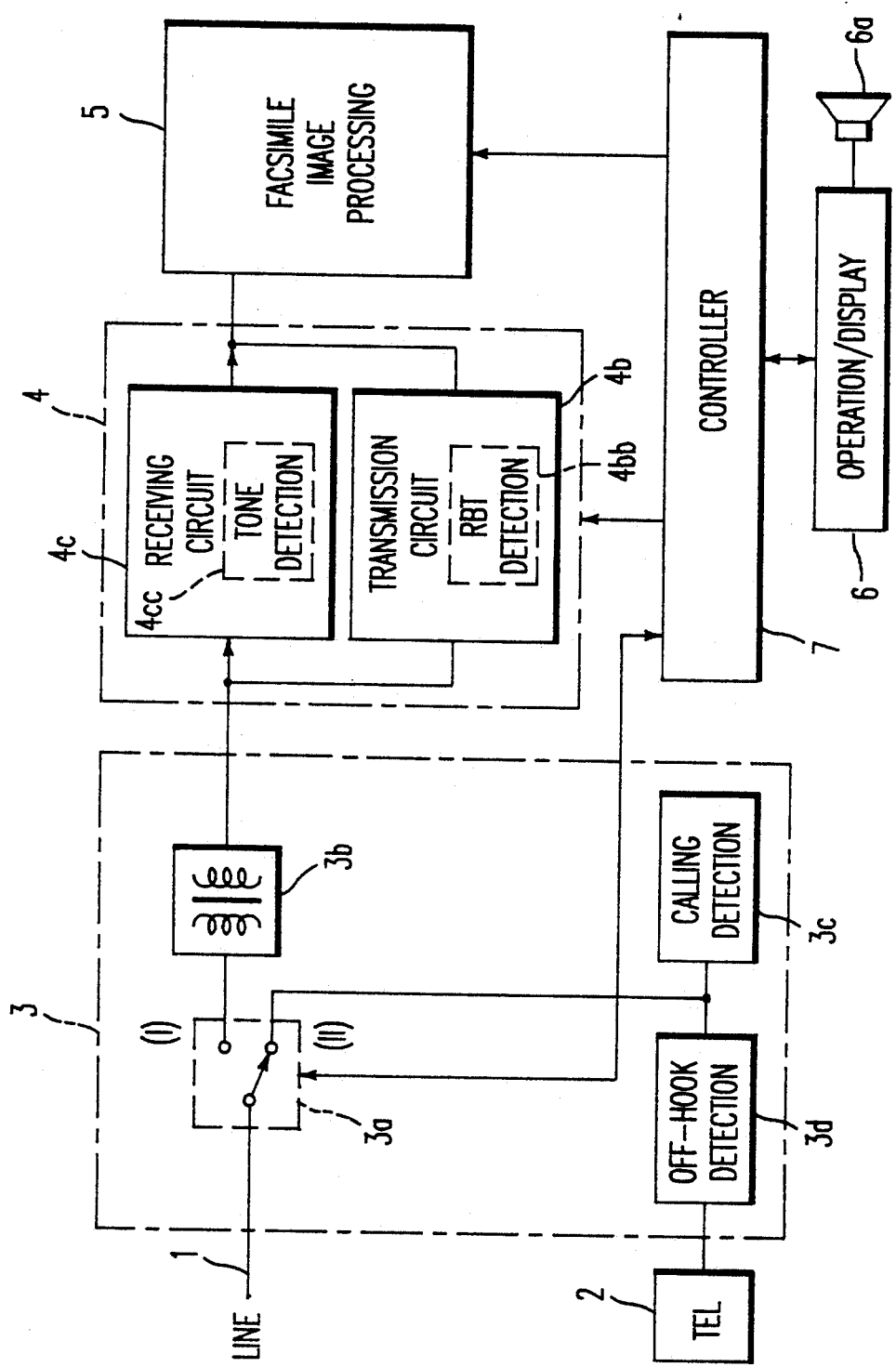
FIG. 14 is a block diagram illustrating a facsimile machine according to a modification of the second embodiment of the present invention.

A description will now be given of a modification of the second embodiment with reference to FIGS. 14, 15 and 16. In FIG. 14, those parts which are the same as those shown in FIG. 7 are given the same reference numbers.

Referring to FIG. 14, an off-hook detection circuit 3d for detecting the off-hook of the telephone set 2 is provided in the network controller 3 in the same manner as that shown in FIG. 11. The facsimile machine formed as shown in FIG. 14 carries out processes shown in FIGS. 15 and 16 when the facsimile machine is called by a calling station.

Figure 15:
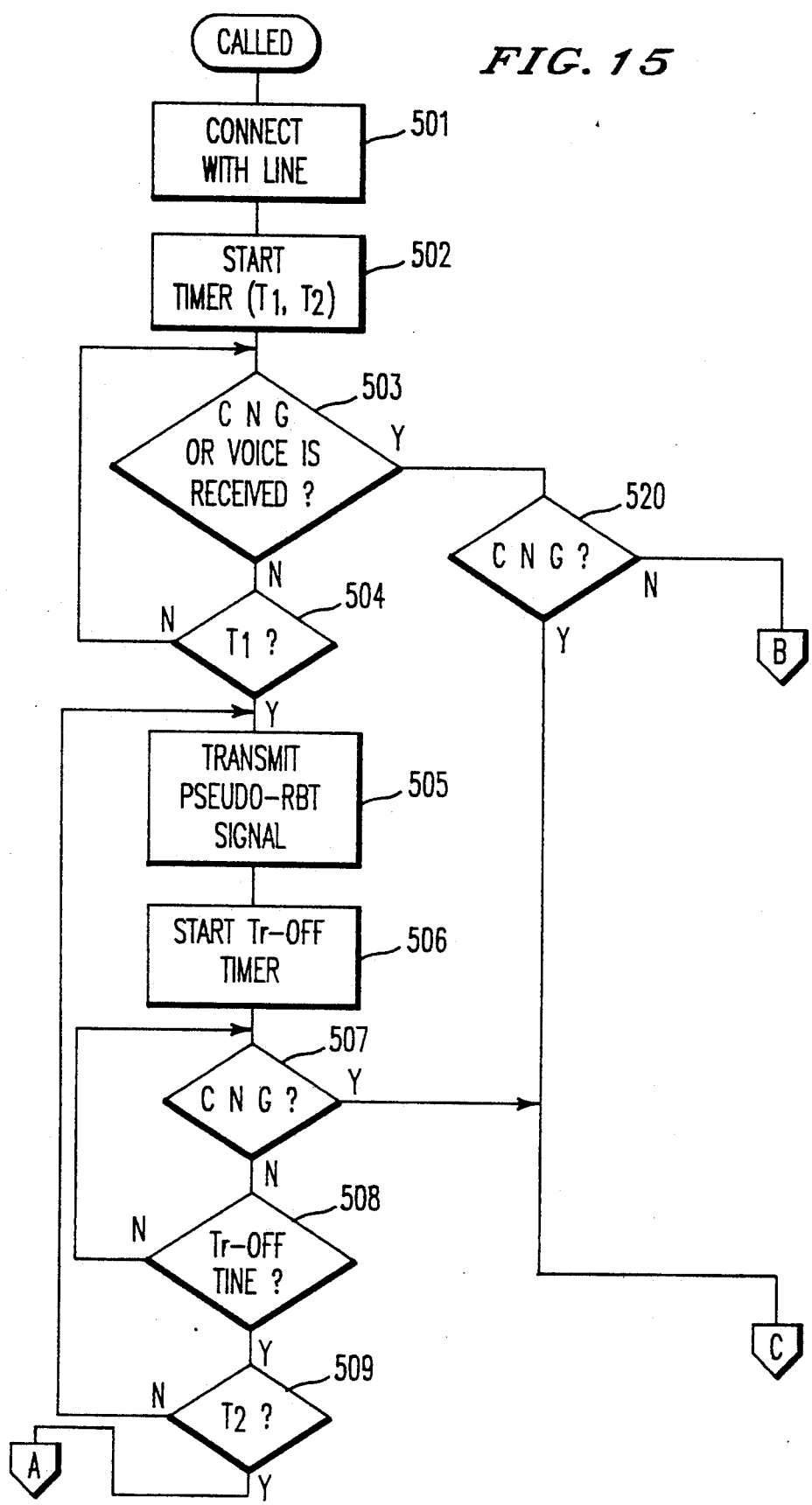
FIGS. 15 and 16 are flow charts illustrating processes carried out in the facsimile machine shown in FIG. 14.
Figure 16:
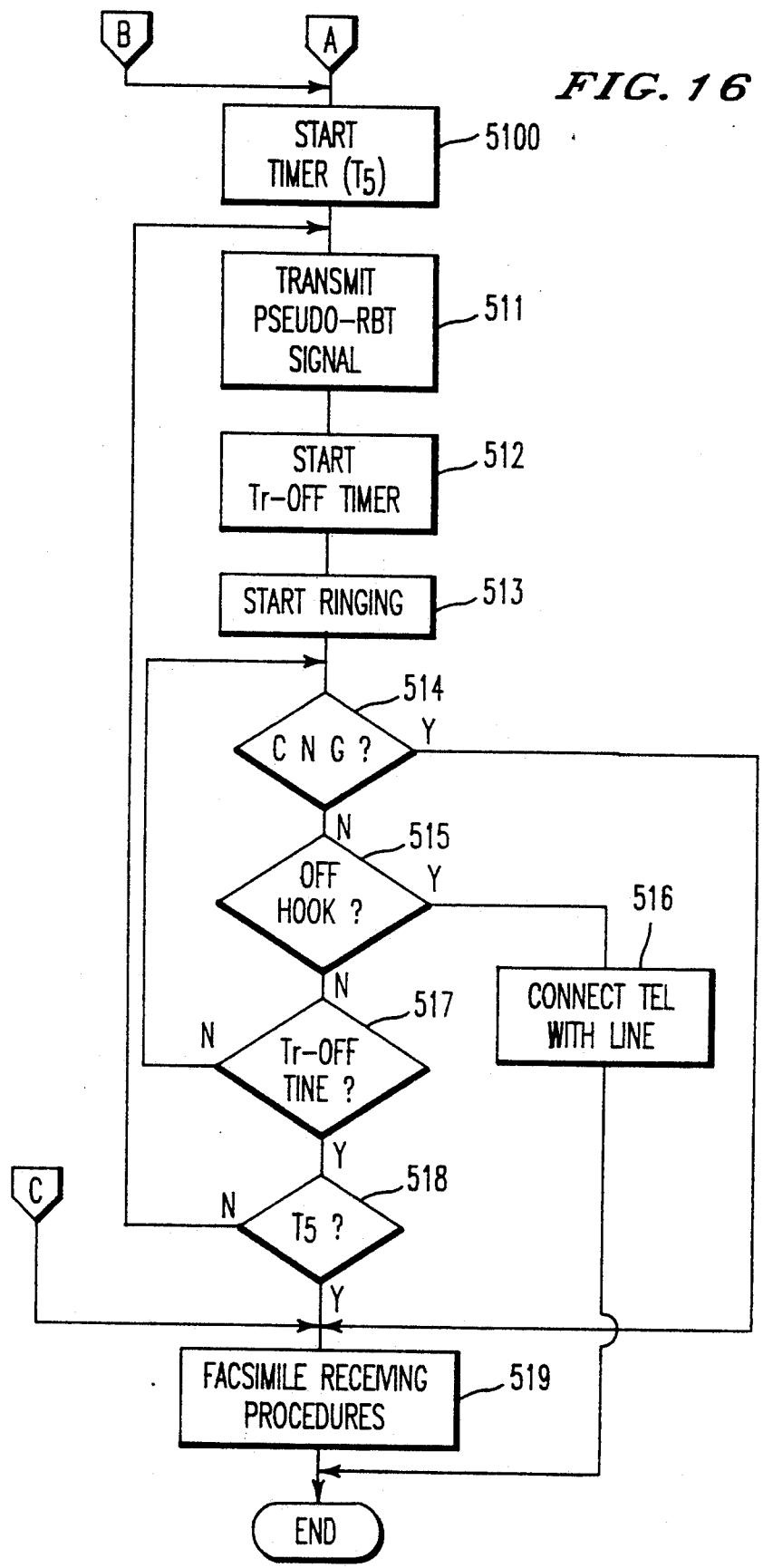

The processes shown in FIGS. 15 and 16 are almost the same as those shown in FIGS. 8 and 9. The processes shown in FIGS. 15 and 16 have steps which correspond to steps shown in FIGS. 8 and 9. Only step 515 differs from a corresponding step 215 shown in FIG. 9. The facsimile machine monitors for the Tr-off time whether or not the CNG signal is received and the off-hook of the telephone set 2 is detected, in steps 514 and 515. When the operator hearing the ringing tone carries out the off-hook of the telephone set 2, step 515 determines, based on the detection signal output from the off-hook detection circuit 3d, that the off-hook of the telephone set 2 is carried out. When the off-hook of the telephone set 2 is detected, the facsimile machine stops outputting the ringing tone and then step 516 switches the switching circuit 3a from the first terminal (I) to the second terminal (II) so that the telephone set 2 is connected with the telephone line 1.

Figure 17:
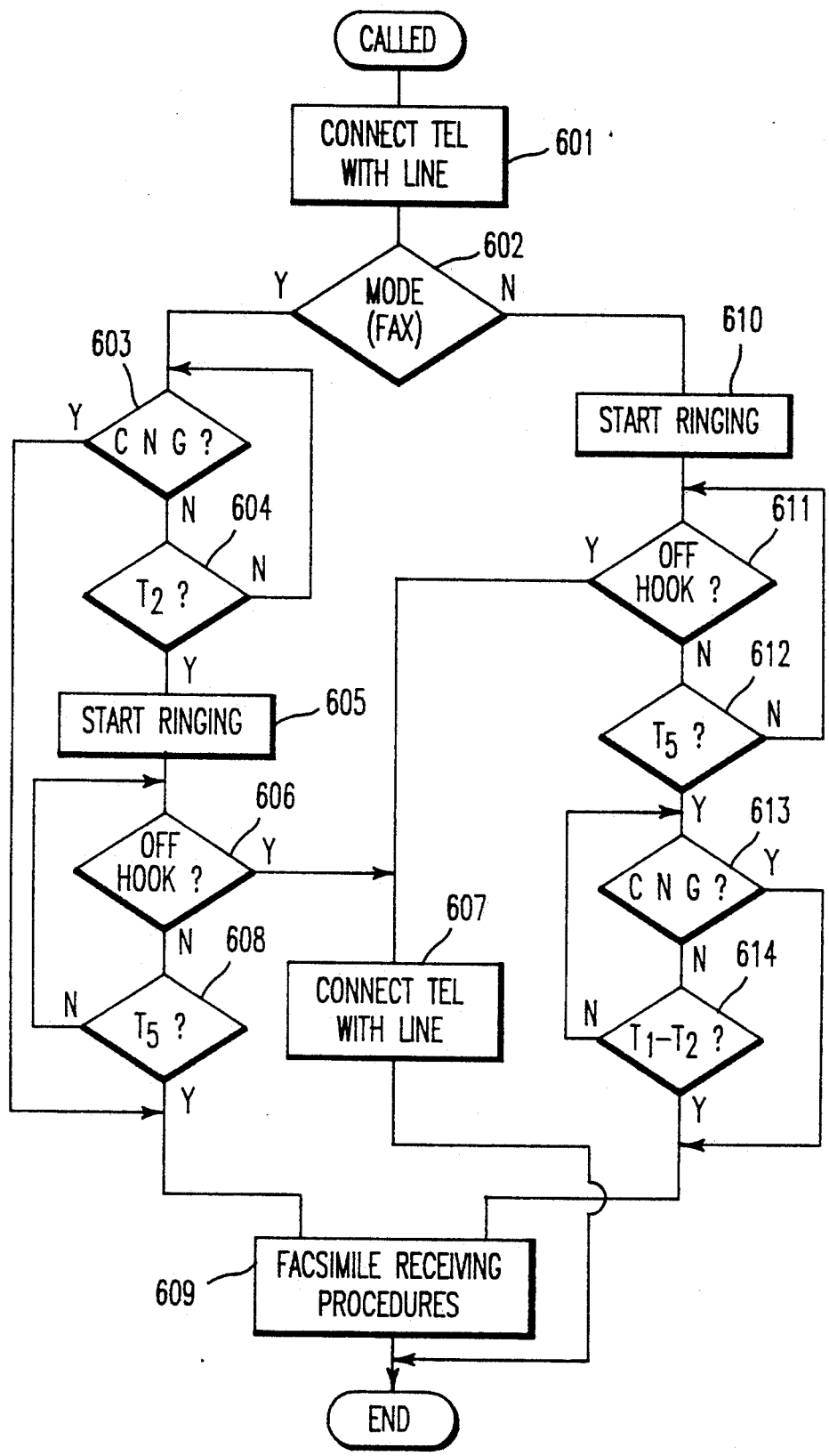
FIG. 17 is a flow chart illustrating a process carried out in a facsimile machine according to a modification of the third embodiment of the present invention.

Further, a description will now be given of a modification of the third embodiment with reference to FIG. 17. In this modification, the facsimile machine shown in FIG. 11 carries out processes shown in FIG. 17. The processes shown in FIG. 17 are almost the same as those shown in FIG. 10. Only steps 606 and 611 respectively differ from corresponding steps 306 and 311 shown in FIG. 10. In steps 606 and 611, the facsimile machine monitors for the time $T_5$ whether or not the off-hook detection circuit 3d detects the off-hook of the telephone set 2. Then, when the off-hook detection circuit 3d detects the off-hook of the telephone set 2, the switching circuit 3a is switched from the first terminal (I) to the second terminal (II) in step 607, so that the telephone set 2 is connected with the telephone line 1.

In the above modifications of the second and third embodiment, when the off-hook of the telephone set 2 is detected, the facsimile machine automatically stops outputting the ringing tone and connects the telephone set 2 with the telephone line 1. That is, it is unnecessary for the operator to operate the stop key to connect the telephone set 2 with the telephone line 1 and to stop output of the ringing tone.

The present invention is not limited to the aforementioned embodiments and modifications, and variations and other modifications may be made without departing from the scope of the claimed invention.

What is claimed is:

1. A communication apparatus comprising data communication means for executing data communications with a calling station and speech communication means for executing speech communications with the calling station, said communication apparatus further comprising:

monitoring means for monitoring signals received by said communication apparatus;
first determining means for determining, based on a result obtained by said monitoring means, whether or not a first signal transmitted from the calling station is received, said first signal indicating that the calling station requires a data communication;

transmission means for transmitting a second signal to the calling station, said second signal indicating that said communication apparatus is ringing;

first control means, coupled to said first determining means and said transmission means, for activating said transmission means in a case where said first determining means determines that said first signal is not received within a first time after said communication apparatus becomes capable of communicating to the calling station;

ringing means for outputting a ringing tone;

control means, coupled to said ringing means, for activating said ringing means when a second time elapses from a time at which said transmission means starts to transmit the second signal, so that an operator hearing the ringing tone can activate said speech communication means; and third control means, coupled to said first determining means, for activating said data communication means when said first determining means determines that said first signal is received.

2. A communication apparatus as claimed in claim 1, wherein said first control means has first timer means for measuring a time from which said communication apparatus is connected to the calling station via a telephone line, said first control means monitoring a result obtained in said first determining means until the time measured by said first timer means is equal to the first time.

3. A communication apparatus as claimed in claim 1, wherein said second control means has second timer means for measuring a time elapsed from a time at which said transmission means starts to transmit the second signal, so that said second control means activates said ringing means when the time measured by said second timer is equal to said second time.

4. A communication apparatus as claimed in claim 1, wherein said first signal is periodically turned on and off at a predetermined period.

5. A communication apparatus as claimed in claim 4, wherein said second signal is periodically turned on and off at a period differing from the period of said first signal.

6. A communication apparatus as claimed in claim 1, wherein transmission of said second signal and monitoring of the signals received by said communication apparatus in said monitoring means are alternately performed in a time sharing process.

7. A communication apparatus as claimed in claim 1 further comprising:

second determining means for determining, based on the result obtained by said monitoring means, whether or not a voice signal is received corresponding to a speech of a calling operator; and fourth control means, coupled to said second determining means and said ringing means, for activating said ringing means immediately when said second determining means determines that the voice signal is received.

8. A communication apparatus as claimed in claim 1 further comprising:

instruction means for outputting a predetermined instruction when a predetermined operation is carried out by an operator; and fifth control means, coupled to said instruction means, for inactivating said transmission means and said ringing means when said instruction means outputs the predetermined instruction, so that the operator can activate said speech communication means.

9. A communication apparatus as claimed in claim 8, wherein said instruction means has detection means for detecting an off-hook condition of a telephone set included in said speech communication means, so that said instruction means outputs the predetermined instruction when said detection means detects the off-hook condition of the telephone set.

10. A communication apparatus as claimed in claim 1, wherein said data communication means includes a facsimile communication means for executing facsimile communications with the calling station.

11. A communication apparatus comprising data communication means for executing data communications with a calling station and speech communication means for executing speech communications with the calling station, said communication apparatus further comprising:

monitoring means for monitoring signals received by said communication apparatus;

first determining means for determining, based on a result obtained by said monitoring means, whether or not a first signal transmitted from the calling station is received, said first signal indicating that the calling station requires a data communication;

transmission means for transmitting a second signal to the calling station, said second signal indicating that said communication apparatus is ringing;

first control means, coupled to said first determining means and said transmission means, for activating said transmission means in a case where said first determining means determines that said first signal is not received within a first time after said communication apparatus becomes capable of communicating to the calling station;

ringing means for outputting a ringing tone;

second control means, coupled to said ringing means, for activating said ringing means when a second time elapses from a time at which said transmission means starts to transmit the second signal, so that an operator hearing the ringing tone can activate said speech communication means; and third control means, coupled to said first determining means for activating said data communication means when said first determining means determines that said first signal is received, wherein said first signal is periodically turned on and off at a predetermined period, said second signal is periodically turned on and off at a period differing from the period of said first signal and said monitoring means is activated when said second signal is turned off.

12. A communication apparatus comprising data communication means for executing data communications with a calling station and speech communication means for executing speech communications with the calling station, said communication apparatus further comprising:

monitoring means for monitoring signals received by said communication apparatus;

first determining means for determining, based on a result obtained by said monitoring means, whether or not a first signal transmitted from the calling station is received, said first signal indicating that the calling station requires a data communication;

transmission means for transmitting a second signal to the calling station, said second signal indicating that said communication apparatus is ringing;

first control means, coupled to said first determining means and said transmission means, for activating said transmission means in a case where said first determining means determines that said first signal is not received within a first time after said communication apparatus becomes capable of communicating to the calling station;

ringing means for outputting a ringing tone;

second control means, coupled to said ringing means, for activating said ringing means when a second time elapses from a time at which said transmission means starts to transmit the second signal, so that an operator hearing the ringing tone can activate said speech communication means;

third control means, coupled to said first determining means, for activating said data communication means when said first determining means determines that said first signal is received; and mode switching means for switching an operation mode from either a first or a second mode to another, wherein the ringing means is activated after said second signal is transmitted in said first mode, and said second signal is transmitted after said ringing means is activated in said second mode.

* * * * *